United States Patent [19]

Baker, IV et al.

[11] Patent Number: 5,632,135
[45] Date of Patent: May 27, 1997

[54] THREE-WAY HARVESTER/DECORTICATOR FOR BAST FIBER CROPS WITH INITIAL CHEMICAL PROCESSING IN THE FIELD UTILIZING IMPROVED STAPLING TECHNIQUE

[75] Inventors: John L. Baker, IV, Naples; Vernie A. Boots, Tampa, both of Fla.

[73] Assignee: Ramie International, Inc., Naples, Fla.

[21] Appl. No.: 494,447

[22] Filed: Jun. 26, 1995

[51] Int. Cl.$^6$ ............................. A01D 45/06; A01F 11/02
[52] U.S. Cl. ............................ 56/14.6; 56/63; 56/121.43; 460/24
[58] Field of Search ........................... 56/14.6, 14.5, 56/60, 63, 71, 94, 121.43, 123; 460/24, 76, 114

[56] References Cited

U.S. PATENT DOCUMENTS

| | | | |
|---|---|---|---|
| 3,599,404 | 8/1971 | Fernandez et al. | 56/14.5 X |
| 3,673,774 | 7/1972 | Mizzi | 56/63 X |
| 3,942,307 | 3/1976 | Wuick | 56/14.5 X |
| 4,151,700 | 5/1979 | Gardella | 56/14.5 X |
| 4,173,177 | 11/1979 | Davis . | |
| 4,231,529 | 11/1980 | Peck et al. . | |
| 4,241,474 | 12/1980 | Doutre . | |
| 5,131,216 | 7/1992 | Otten et al. | 56/63 X |
| 5,218,899 | 6/1993 | Jacobs . | |

Primary Examiner—Terry Lee Melius
Assistant Examiner—Heather Shackelford
Attorney, Agent, or Firm—Oldham & Oldham Co., L.P.A.

[57] ABSTRACT

A machine for harvesting and decorticating ramie plants is shown in the form of a wheeled vehicle using an adjustable sickle bar or rotary blades located in the front of the machine for selecting the mature stalks. A series of entry points are provided for the plants, wherein the uniformly cut stalks travel back falling on an apron at a 45° angle for the first decorticating butt drum. A leaf stripper strips any leaves left at the stalks just before the butt decorticator drum. The second decorticating drum has helically arrayed bars on its exterior surface, operably disposed adjacent a machined surface located on a first leg of a generally U-shaped breast plate, such that the interaction of the bars with the breast plate removes unusable portions of the plants adjacent the upper ends and frees the ramie fibers. The third decorticating drum is operably disposed adjacent the machined surface located on the second leg of the U-shaped breast plate, for further removal of unusable plant portions from the ramie fibers resulting in clean decorticated fibers rather than ribboned fibers. Water is sprayed onto the stalks at point of entry into the third drum which facilitates the decortication and cleaning of the fiber being pulled out of the drum.

7 Claims, 8 Drawing Sheets

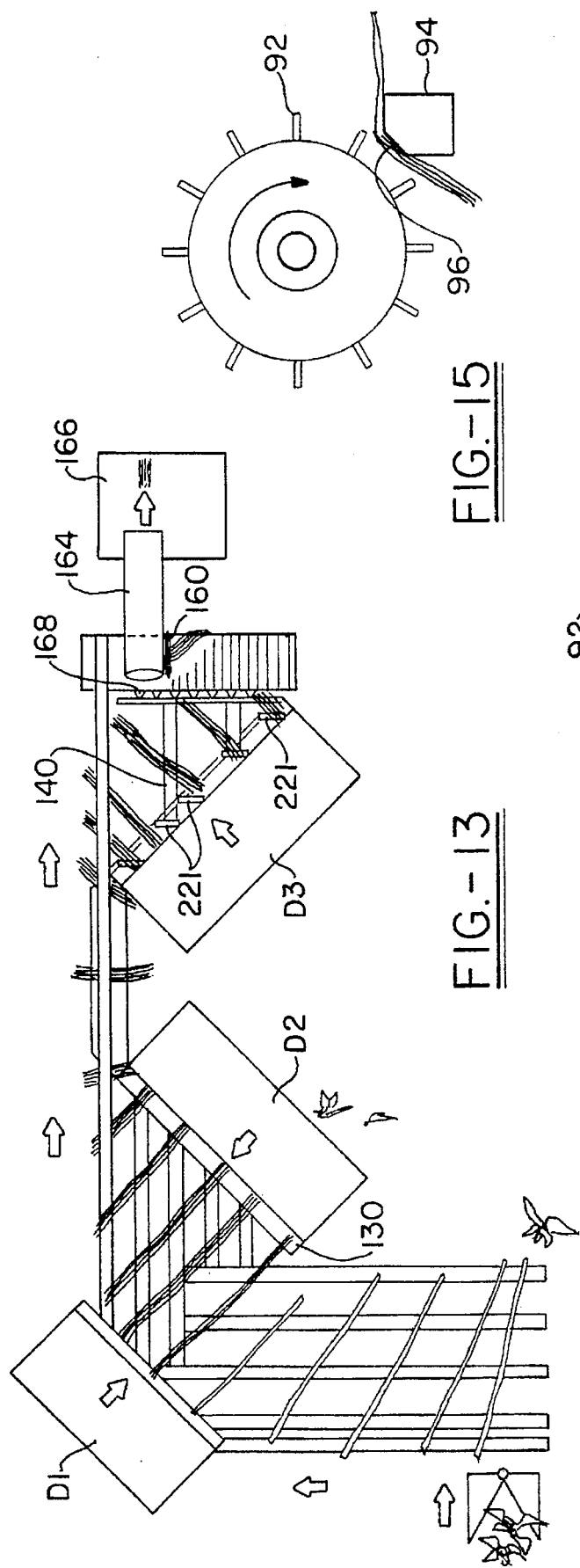
FIG.-13
FIG.-15
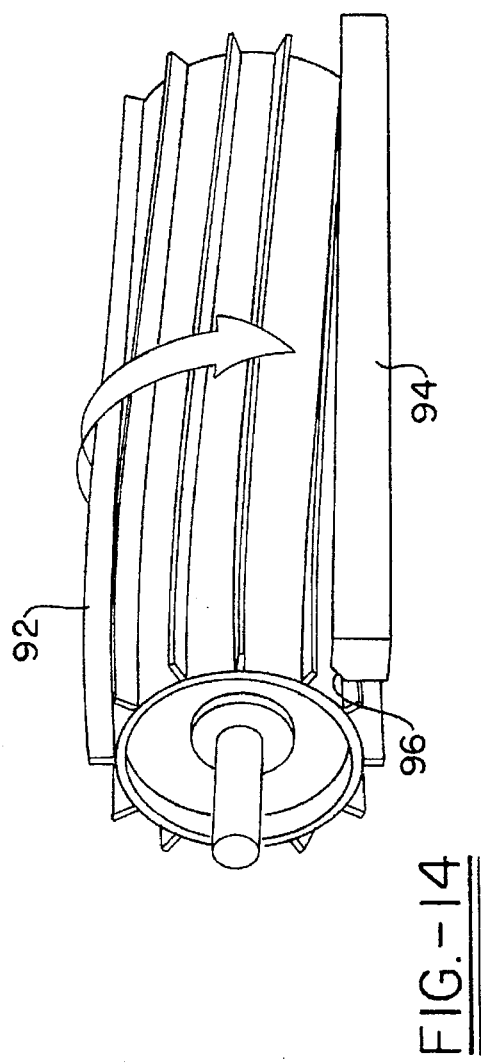
FIG.-14

THREE-WAY HARVESTER/DECORTICATOR FOR BAST FIBER CROPS WITH INITIAL CHEMICAL PROCESSING IN THE FIELD UTILIZING IMPROVED STAPLING TECHNIQUE

BACKGROUND OF THE INVENTION

This invention relates to improvements in the production of vegetable fiber and more particularly to an improved method and apparatus for harvesting ramie and for preparing fiber therefrom of high commercial quality, with a minimum of hand labor.

The use of ramie fiber apparently originated in the Orient and hand cleaned fiber known commercially as "China grass" was imported into this country for many years up until the time such imports were cut off by military activities in China. Unfortunately, this hand cleaned Chinese fiber was not sufficiently free of bark and other parts of the plants and was not received in sufficient quantity to achieve widespread use in the textile industry. It has been known since antiquity to Oriental peoples, however, as a source of fiber for domestic cloth. Presently it is being imported in finished goods form (sweaters, dresses) from Asian countries.

Some prior work has been done in an attempt to design a successful decorticating apparatus, but the majority of these earlier machines have been designed as general purpose machines and consequently do not operate satisfactorily with ramie, which has peculiar properties requiring specially designed machines.

For instance, ramie cannot be fed through a decorticating apparatus by normal feeding rolls since the ramie will wind up on the rolls and will not follow a straight path therebetween. This property therefore requires the employment of some sort of gripping means that will pull the ramie through the machine. Also, ramie fiber must be processed immediately after cutting the plants, as a fiber destroying ferment, apparently of enzymic character, begins soon after the plants are cut and the organic gums and resins in the plant also harden and become comparatively insoluble. This requires that the ramie decorticating apparatus be used at the location at which the plants are grown in the field. It should be noted that each ramie crop produces about ten (10) tons per acre per harvest and this machine eliminates 90% of the normal transport costs.

Although this invention is primarily concerned with the harvesting of ramie, and the preparation of fibers therefrom, this invention is also applicable to the harvesting of kenaf and the preparation of fibers therefrom. The invention also incorporates initial chemical processing in the field enabling handling and production costs to be substantially lower while improving the quality of the fiber and standardizing fiber lengths from the field so that the textile industry can depend on more uniform, high quality pre-classification fiber.

Inasmuch as ramie is a tropical plant growing best in well drained soils, the decorticating apparatus must be used in locations where very little skilled labor may be available, and where it is subject to adverse climatic conditions. To meet these conditions, the apparatus must be reasonably easy to transport and assemble, must be as completely automatic in operation as far as possible, and must have little tendency to get out of order. Further, in view of the necessity of cleaning the fiber immediately after cutting, it is highly desirable that a decorticator be included with the harvesting apparatus.

Heretofore, it has apparently been impractical to combine a harvester and decorticator in one unitary apparatus, partly because of the heavy weight typically associated with decorticators, and the fact that due to this weight, these prior art decorticators could not incorporate harvesting apparatus and still be light enough to move effectively over ground (on the ramie plantation) while incorporating efficient production capacity.

As the usable dried fiber amounts to only about four percent of the green weight of the stalks, any material loss of fiber is extremely important from a commercial viewpoint. Consequently, a decorticating apparatus, to be successful, must be designed to adequately clean the fiber and still not loose any appreciable amount thereof.

After the fiber has been cleanly decorticated and stapled, it is put through a degumming process (which is initiated in the field with the freshly decorticated stapled fiber), which dissolves the organic gums and resins which are present with the fiber. The fibers are then separated and carded according to usual textile methods and may be subsequently bleached, dyed, spun and woven as may be desired.

In order that the fiber separating and carding apparatus may operate successfully on the long staple fibers which the ramie plant produces, it is indispensable that the fibers are completely clean of any bark material or residue gums at the conclusion of the decorticating/degumming process and it is also highly desirable that the fibers should contain substantially all of the commercially usable fiber from the stalks.

It was to achieve an improved self-mobile harvesting/decorticating apparatus, utilizing in addition a highly advantageous stapling technique, while incorporating in-line fresh degumming that the present invention was evolved. It should also be noted that 80% of the crop production will be returned to the field as the machine moves through the field which decreased drastically the use of fertilizers and ecologically is an excellent way to maintain a better way to organically fertilize the crop. Additionally, transport costs are practically eliminated with this new system.

SUMMARY OF THE INVENTION

It is to be seen that we have provided a machine for harvesting and decorticating ramie plants, and quite importantly, for thereafter stapling and sorting the fibers obtained from the plants. It is known that the butt fibers of the ramie plant are the thickest (heavier denier), whereas medium size fibers come from the mid section of the plant, and the thinnest fibers come from the top of the plant.

As will be seen in detail hereinafter, our machine takes the form of a wheeled vehicle for travelling through a field in which numerous ramie plants are growing in a random manner, approximately six (6) mature stalks per square foot, with a suitable severing means being located in the front of the vehicle. The machine also selects the mature stalks ready for harvest while eliminating the immature stalks (which lower the quality of fiber harvested) by using an adjustable cutting head and adjustable cutting blades. Transport means are located near the front of the vehicle, which means are utilized for carrying the severed ramie plants laterally across the front of the vehicle, to suitable locations for the accomplishment of decortication. This decortication is to be accomplished while the vehicle is underway, and to this end we provide a plurality of rotatable decorticating drums operably mounted on the vehicle, designed and operated to achieve a highly effective separation of the fibers from their tough outer covering.

The severing means utilized on the front of the vehicle may be in the form of a sickle bar or the like (rotary blades). In order to guide and stabilize the ramie stalks during the severing thereof, we prefer to utilize a series of entry points for the plants, with a pair of moving belts operating in a cooperative manner being utilized at each entry point. Each pair of cooperating belts is arranged to travel in a rearward direction at approximately the speed over ground of the vehicle, with the upper portions of the plants being effectively grasped and stabilized by these belts during the time that the severing of the plants takes place at a location slightly above ground level. The stalks travel back and are then severed at the top by adjustable rotary blades to the height of the crop allowing for the uniformly cut stalks to fall on an apron at a 45° angle placing the stalks in a position required for No. 1 decorticating butt drum. The tops of the stalks are very leafy and when cut, the tops with leaves are carried off the machine by blower or conveyor to be processed into animal feed meal containing 23% protein, 5% calcium.

A substantially flat, slightly angled apron table is disposed across the front of the vehicle, extending laterally from an entry location for the plants/stalks, to a location at which a first decortication operation takes place We utilize movable means upon the upper surface of the apron for transporting the severed ramie stalks laterally across the front of the vehicle. Importantly, the arrangement we prefer to use is operating in such a manner as to cause the plants to reside on the apron at approximately a 45° angle to the direction of movement, with the ground severed ends of the plants foremost. A leaf stripper strips any leaves left at the stalks just before the No. 1 butt decorticator drum which enhances the decortication process in the three (3) decorticating drums. The stripped leaves are conveyed off the machine together with the foliage tops.

The first decorticating drum is operably disposed adjacent the terminal end of the apron, with this first decorticating drum containing helically arrayed means on its exterior surface, which helically arrayed means is operably disposed adjacent the machined edge of a shear bar. As a result of the interaction of the helically arrayed means with the shear bar, a removal of unusable portions of the plants adjacent the severed ends of the plants is accomplished. To this end, we can use one or more endless belts on the underside of the shear bar, placed so as to assure proper movement of the ramie fibers across the full width of the shear bar. This prevents any tendency for an undesired bunching of the fibers to take place in one area of the shear bar.

We provide means for gripping and transporting the stalks leaving the first decorticating drum, which means causes a change in the direction of travel, in that the plants now move along one side of the harvester in a rearward direction, with the tops of the ramie stalks opposite the upper severed ends promptly being caused to enter a second decorticating drum.

The second decorticating drum has helically arrayed means on its exterior surface, operably disposed adjacent a machined surface located on a first leg of a generally U-shaped breast plate, such that the interaction of the helically arrayed means with the machined surface of the breast plate accomplished a removal of unusable portions of the plants adjacent the upper ends thereof, thus to free the ramie fibers. The means for gripping and transporting the plants then serves to move the freed ramie fibers around a central portion of the U-shaped breast plate, and into contact with a third decorticating drum.

The third decorticating drum is operably disposed adjacent a machined surface located on the second leg of the U-shaped breast plate, to accomplish a further removal of unusable plant portions from the ramie fibers resulting in clean decorticating fibers vs. ribboned fibers. As was the case with the shear bar of the first decorticating drum, we prefer to use one or more additional endless belts on the underside of the shear bar of the second and the third decorticating drums, to assure the proper movement of fibers there across, thus to avoid any tendency for an undesired bunching of the fibers to take place. We also will spray water on the stalks at point of entry into the drum which facilitates the decortication and cleaning of the fiber being pulled out of the drum. The water will be transported by the truck or trailer into which the fiber will be loaded.

After this final decortication, we then cause the ramie fibers to move into contact with a rotating, cylindrically-shaped roll, with such ramie fibers wrapping around the surface of the roll at approximately a 45° angle to the axis of rotation of the roll. Quite importantly, we provide a plurality of circularly-shaped cutting blades disposed in an evenly spaced relationship on a rotating axis disposed parallel to the axis of rotation of the cylindrically-shaped roll, with the cutting blades being caused to rotate with their peripheral edges disposed closely adjacent the surface of the cylindrically-shaped roll. In this way a highly effective cutting of such fibers into consistent lengths can be accomplished. We thereafter provide a vacuum arrangement for removing the cut fibers, which are then sorted by size into bins.

It is therefore a principal object of this invention to provide a machine for harvesting and decorticating ramie plants, and for thereafter stapling the ramie fibers and sorting them by denier, sizing and initiating degumming immediately after stapling fiber with all of this being accomplished in the field, while the machine is underway. The construction of this machine is also possible due to the advent of hydraulics and high flotation tires.

It is another object of this invention to provide a machine of highly advantageous construction that will sever the ramie plants and then cause such plants to successively pass through a plurality of rotating decorticating drums, wherein the unusable portions of the plants are removed and returned immediately to the field as organic fertilizer, this being followed by passing the fibers as a substantial angle over a rotating roll, whereon the fibers are cut into lengths so as to facilitate the handling and initial degumming process of the fibers in the field drastically reducing production costs while producing uniform fiber.

It should be noted that former machines and system designed for ramie would lose up to 60% of the fiber that the crop had in the field before harvesting, but due to the inefficiency of the machines and systems formerly used, the end cost of ramie fiber produced ready for textile use would be two-three times more due to these inefficient machines and systems. It is still another object of this invention to provide a machine for harvesting ramie plants, with the severed plants being caused to move across the front of the machine at an angle with regard to the direction of motion of the machine, with the plants thereafter being decorticated and the fibers caused to wrap at approximately a 45° angle around a generally cylindrical drum, with the fibers thereafter being cut to desired lengths on the drum and sorted into sizing bins where the degumming process is immediately initiated.

It is a still further object of this invention to provide an improved harvesting and decorticating apparatus especially adapted to cleaning ramie fiber which will produce relatively straight, thoroughly cleaned decorticated fiber of substantially parallel fibers without material loss of commercially usable fibers, with such fibers finally being cut into desired lengths.

It should also be noted that by initiating chemical treatment of the fiber in the field will reduce substantially the use of chemicals/enzymes needed to degum fiber while reducing substantially the energy cost at the processing plant. It should also be noted that by initiating the chemical process in the field that while stopping the natural fermenting process of the wet fibers, it also allows for making available the pectus and resins that the ramie fiber has on the outer layer, which are separated in the degumming process and can be utilized commercially for resins and glue industry as a by-product if produced in volume.

BRIEF DESCRIPTION OF DRAWINGS

FIG. 13 is an overhead view of the flow of transporting the ramie stems from the cutting head to the stapling drum at the end of the machine which is then blown into a transport truck;

FIG. 14 is a perspective view, showing the construction of a typical decorticator drum, and its relationship to the shear blade utilized for removing the outer covering from the ramie fibers;

FIG. 15 is an end view of the drum of FIG. 14 showing the relationship of the decorticated ramie fibers to the drum and the breast plate.

DETAILED DESCRIPTION

Figure 1:
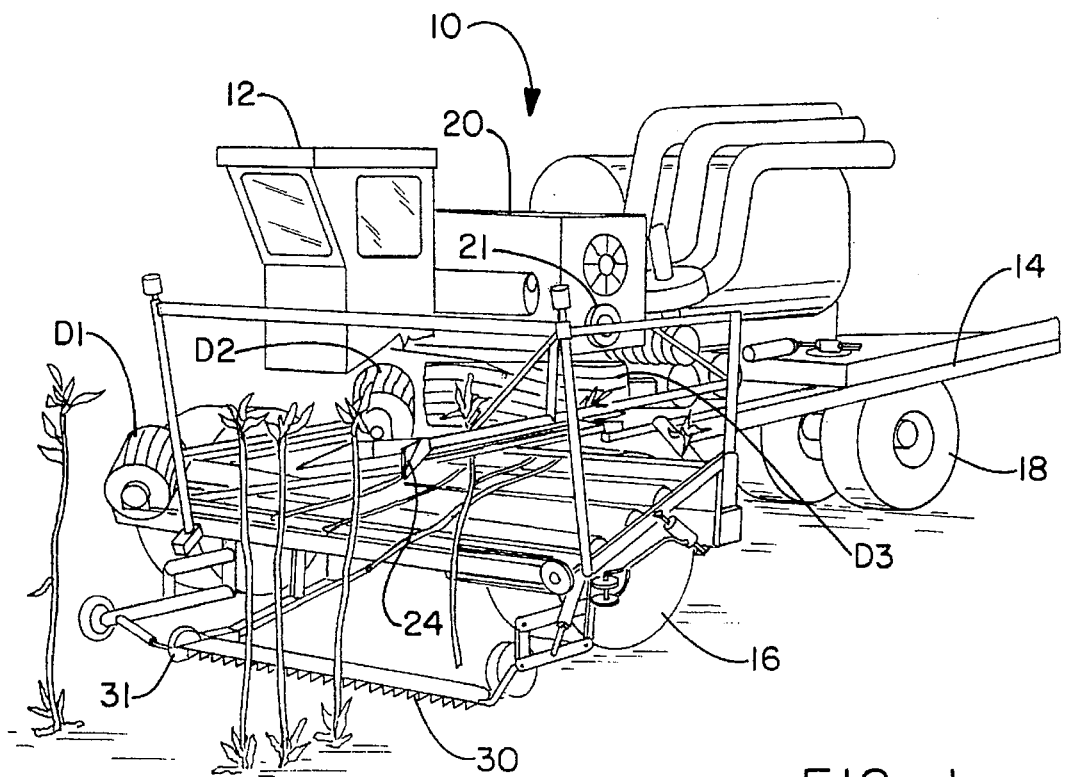
FIG. 1 is a perspective view of our bast fiber harvesting, decorticating and stapling machine, taken from the left front corner of the machine, looking generally rearwardly.

With reference to FIG. 1, it will be seen that we have shown a frontal perspective view of our novel harvesting, decorticating and stapling machine, principally involving a vehicle (10) having a cab (12) in which the driver-operator rides, which cab is supported upon a frame (14).

Supporting the front of the frame (14) are front wheels (16), whereas rear wheels (18) support the rear of the frame (14). We preferably steer the vehicle by utilizing steerable rear wheels, with the steering controls being contained, of course, in the cab (12). We are not, however, to be limited to an arrangement in which steering is accomplished by the rear wheels.

Carried upon the frame (14) is the engine (20), which is coupled to a large capacity hydraulic pump (21) that is operatively connected by the use of high pressure lines to a suitable hydraulic motor utilized at each of the four principal wheels of the vehicle. This arrangement enables the vehicle to be driven through a field of growing ramie plants at a selected speed, as brought about by appropriate manipulation of the controls by the operator. Preferably wide tread pneumatic tires are utilized on the front and rear wheels.

As will be seen hereinafter, the hydraulic pump (21) also supplies hydraulic fluid under high pressure by the use of high pressure lines to numerous other hydraulic motors utilized throughout the machine, which motors are utilized in order to power the various belts, cutters, elevating devices, and the like.

Figure 2:
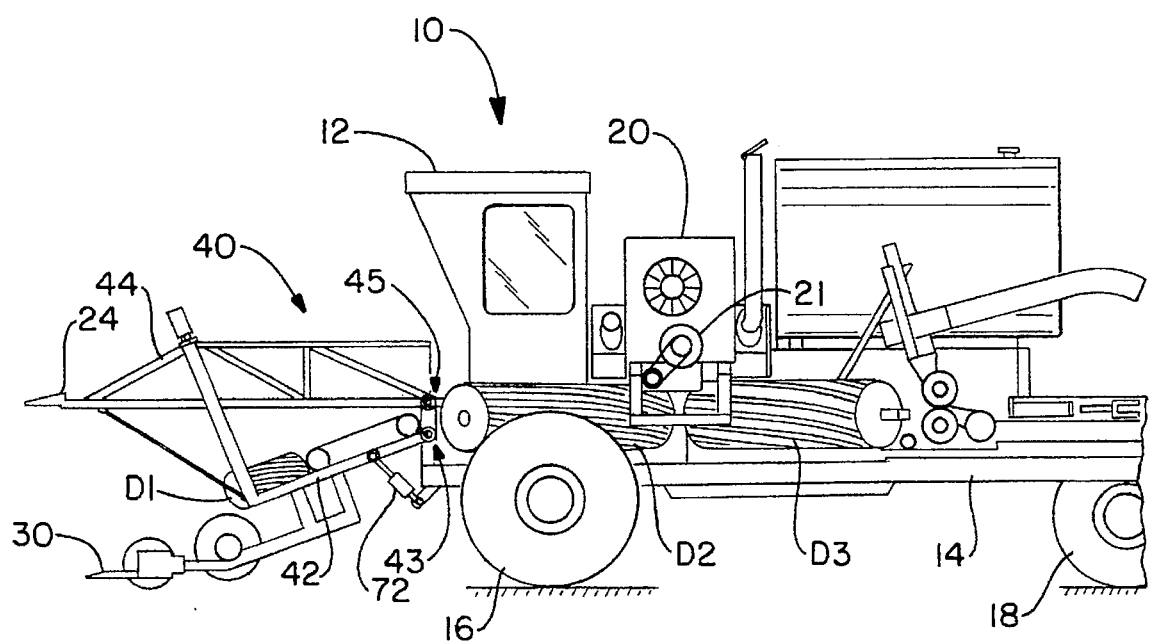
FIG. 2 is a side elevational view of the machine of FIG. 1.

FIG. 1 as well as FIG. 2 reveal certain other details to be considered hereinafter, such as the use on the vehicle of a plurality of effectively positioned rotary decorticating drums (D1) through (D3), which are each powered by a hydraulic motor of a suitable size. It is to be realized that the first decorticating drum (D1) is operatively mounted on the frame (14) adjacent the right front corner of the vehicle (10), which is therefore seen at the left side of FIG. 1.

Figure 3:
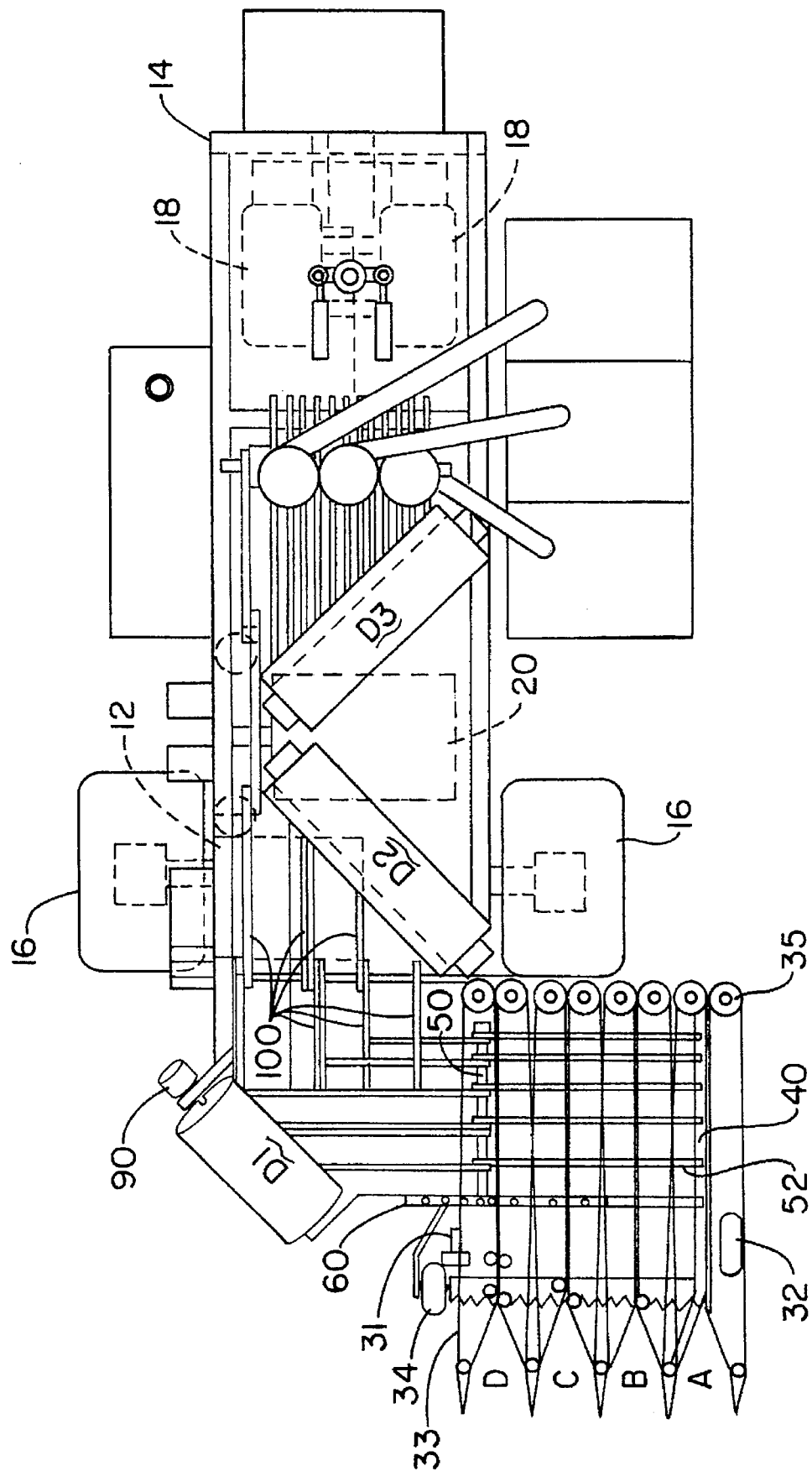
FIG. 3 is a plan view taken in a manner to show the pickup array on the left, making clear that the harvested ramie plants go first to decorticator drum D1, and thereafter to decorticator drums D2 and D3 before the stapling procedure is undertaken.

The ramie plants are typically growing in a random array, so as shown in FIG. 1, but in more detail in FIG. 3, we provide a pickup array (24), involving a number of pairs of endless moving belts disposed in an evenly spaced relationship across the front of the machine. Extending across the front of the machine, to be used in connection with the several belt arrays, it is a sickle bar (30), serving as the means for severing the plants.

As best seen in FIG. 3, each belt (33) of a pair of belts of the pickup array operates in the same plane as, and in a closely abutting relation to, the other belt of the pair. The belts are supported in operative positions by a series of pulleys (35). In accordance with conventional practice, the cooperating belt portions of each pair of belts are biased together so as to readily grasp the upper portions of the encountered ramie plants, with the rearward speed of travel of these belt pairs closely matching the speed of the vehicle (10) over the ground. In other words, the abutting portions of the pairs of belts have a front-to-rear effective motion, serving to move the severed plants rearwardly. Thus, each co-functioning pair of belts serves to grip the upper portions of the encountered ramie plants at an appropriate location, and stabilize the plants just prior to and during the time that the sickle bar (30) is severing the plants at a location just above ground level. The sickle bar is disposed in a laterally-extending direction across the front of the vehicle, preferably being driven by a hydraulic motor (31) located on a forward portion of the vehicle.

As is obvious, there must be a definite relationship between the location of the sickle bar 30, and the particular location at which the cooperating belts grasp each next stalk of ramie that is encountered. With reference to related FIGS. 4 and 5, it is to be seen how each plant is stabilized by a pair of belts during the time it is being severed. As will be apparent from these two figures, we typically position the sickle bar (30) somewhat behind the initial grip points of the belts so that the stalk is fully stabilized prior to cutting. Located adjacent the ends of the sickle bar (30) are guide wheels (32) and (34), which serve to carry the weight of the apron (40) that extends across the front of the vehicle; note FIGS. 1 and 3. It is the function of the apron (40) to receive the severed ramie stalks as they fall, and more details of the apron will be discussed hereinafter.

The guide wheels (32 and 34) are preferably utilized in a staggered relationship, as made clear from FIG. 3. This arrangement is utilized inasmuch as it is desirable for the left front wheel (32) to be positioned so as to avoid trampling standing ramie.

With reference to FIG. 3, it will be noted that we have shown entry points A, B, C and D for the standing rows of ramie, with it to be understood that a pair of endless moving belts is associated with each of these entry points. The entry points A–D are about two feet wide, thus giving a total cutting swath of about 8 feet. Each belt of the several pairs of endless belts is driven from rearward locations on the pickup array (24) by a suitable respective hydraulic motor, such that rearwardly moving portions of each pair of belts travel together at the same rate of speed.

Because of the arrangement we use, as the sickle bar (30) cuts the bottoms of the standing plants, the rearwardly travelling portions of the several pairs of endless belts serve to deliver the severed plants onto the apron (40), in the general manner depicted in FIG. 1. As will be discussed hereinafter in connection with FIG. 7, the apron (40) is made up of carrier apron (42) hingedly supported at (43) from the frame (14), and the outboard apron (44), hingeally supported from the carrier apron at (45).

The upper part of the apron (40) does not present a stationary surface, but rather the upper apron surface is constituted by a number of powered chains. For example, we may use five or more such chains, designated chains (52); note FIG. 3. These endless chains all travel at the same speed, and function in a manner serving to carry the ramie plants laterally toward decorticator drum (D1), with the stalks residing on this chain array at a particular angle. The left ends of the chains (52) are carried by a series of sprockets (58) mounted on a common shaft (59).

Figure 6:
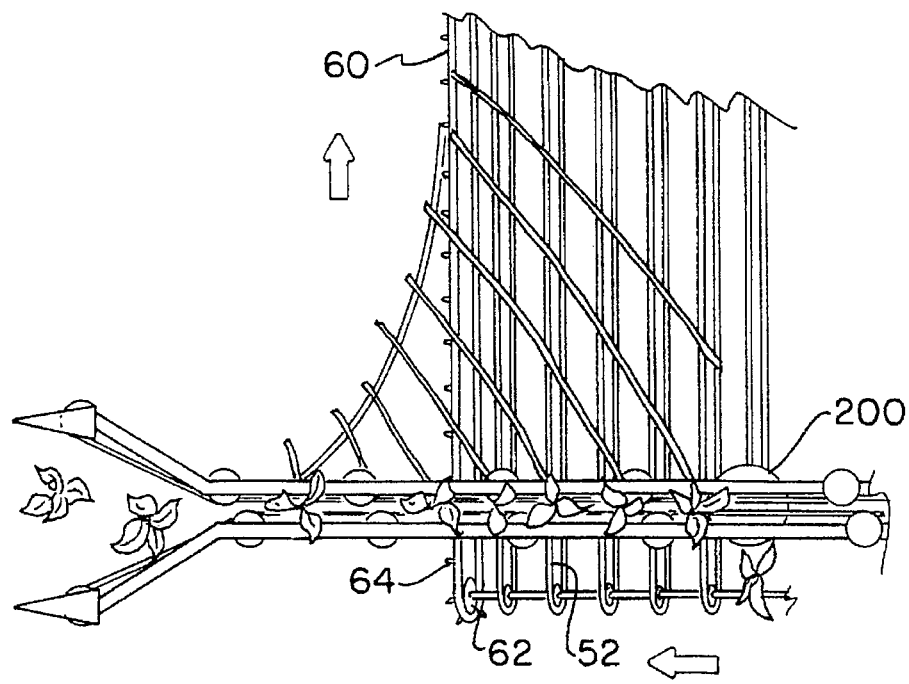
FIG. 6 is a view showing the progression of the ramie stalks toward the first decorticator drum.

FIG. 6, which is a view from the front of the vehicle looking rearwardly, reveals that although for the moment, the upper ends of the plants continue to be grasped by a pair of belts, the severed end portions of the plants, known as the butt ends, are being caused to move to the left when viewed from the front.

To assure the butt end of each ramie stalk entering the first decorticating drum (D1) at the desired angle, we utilize a rapidly moving, endless chain (60) at the front of the apron, as best seen in FIG. 6. Pulley (62), visible in this figure, is one of a pair of pulleys forming a support for the rapidly moving chain (60). As will be noted, a series of upstanding teeth (64) are utilized on the chain (60), with it being the function of these teeth to move the butts or severed ends of the stalks more rapidly along the upper front surface of the apron than the tops of the stalks. As a result, the ramie stalks are caused to reside on the less rapidly moving chains (52) at approximately an angle of 45°, which is a particularly desirable relationship to the decorticating drum (D1). The functioning of the drum (D1) will be discussed at greater length hereinafter.

Figure 4:
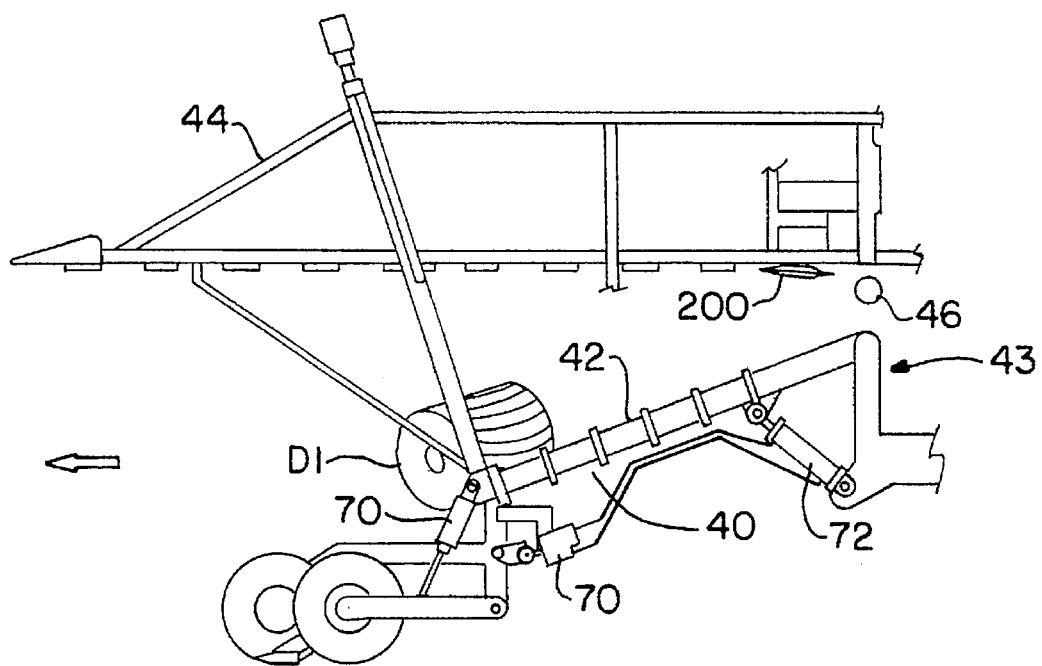
FIGS. 4 and 5 are a fragmentary view of the harvesting operation, shown to a large scale to make clear that the plants are stabilized by the pickup belts during the operation in which they are severed from the ground.

As visible in FIG. 1, and in more detail in FIG. 4, we provide hydraulic actuators near the front of the apron for enabling the driver to establish the height of the front edge of the apron. The hydraulic actuator (70) visible in these figures is representative of these devices. Similarly, we provide additional actuators near the rear of the apron for enabling the driver to change the angularity of the apron with respect to the ground. The hydraulic actuator (72) visible in these figures is representative of these devices. Suitable controls for these actuators are provided in the cab (12) for the convenience of the operator, such that he can not only control the positioning of the apron, but also control the speed of the vehicle, the gripping belts, and steer the vehicle through the fields as well as over the roads that are used to interconnect the fields where ramie is growing. Additional aspects of the apron (40), including novel hinging relationships involved therein will now be described.

Figure 7:
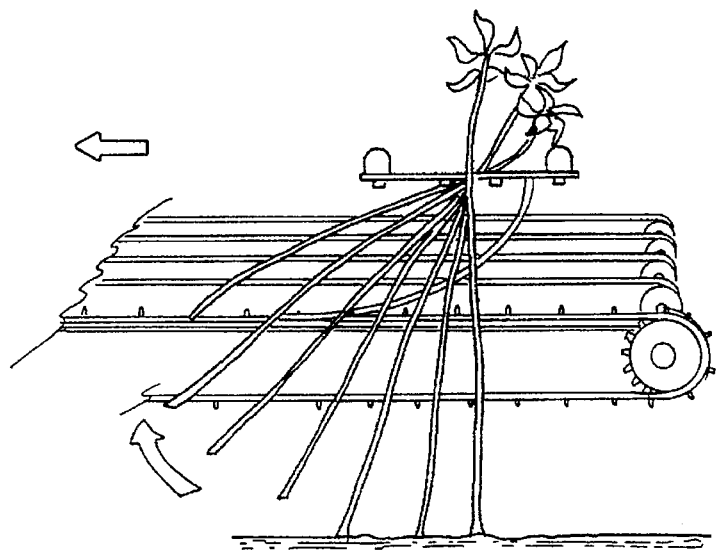
FIG. 7 is a fragmentary view, revealing the fast moving chain utilized for causing the ramie stalks to reside on the apron at an angle to the direction of travel of the vehicle.

As previously mentioned in connection with FIG. 7, we preferably construct the apron (40) to have a carder portion (42) as well is an outboard portion (44), which are hinged together at (46). The height of the outboard end of the outboard section of the apron is controlled by the left front guide wheel (32). It is therefore to be understood that the outboard end of the outboard section of the apron will tend to travel up and down in accordance with the contour of the terrain; note the detail shown on the right hand side of FIG. 1, and also FIG. 4.

Although we obviously are not to be limited to any particular number, we have found it desirable to dispose the five traveling chains (52) laterally along the sloping upper surface of the apron (40). We dispose each chain in such a manner that it slopes downwardly and rearwardly and to the right, so as to avoid undesirable contact between the chains and so as to deliver the stalks of ramie in the desired angular relationship along the apron. We preferably drive the chains from a rotating shaft (50) that is operatively mounted in a location coincident with the hinge line (46) separating the outboard and inboard sections of the apron, with the shaft (50) preferably being driven in rotation by a suitable hydraulic motor (51).

Figure 10:
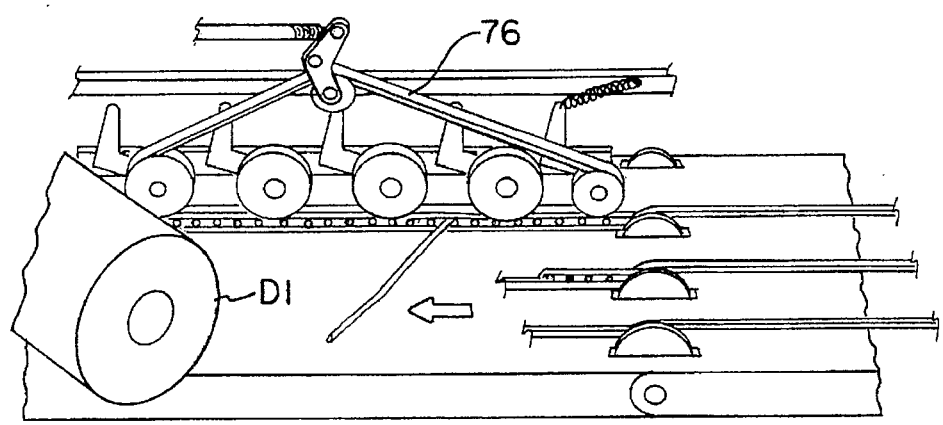
FIG. 10 is detailed front apron view showing the belts and the ramie stalks as they are transported towards the Drum 1 for butt stem decortication.

It should by now be well understood that the traveling chains (52) serve to deliver the severed ramie stalks laterally across the upper surface of the apron (40) in a parallel array toward the first decorticating drum (D1), with the stalks traveling across the apron in approximately at 45° relationship to the direction of travel of the vehicle. This angularity of the ramie stalks as they move along the apron is highly desirable inasmuch as it is intended that the butt ends of the ramie plants be in a perpendicular relationship to the axis of rotation of the decorticating drum (D1) as they move into engagement with the cutters of this drum, as seen in FIG. 10. We may find it desirable to utilize a plurality of pressure applying belts (76) directly above the several traveling chains, to assure the proper insertion of the butt ends of the ramie plants into the drum (D1).

It may not be conveniently possible to utilize the chains (52) to extend the full distance across the apron (40) to the first decorticating drum (D1), so we may utilize a second set of chains (82), to carry the ramie stalks the remaining distance to the first decorticating drum (D1). This second set of chains would be driven from the same power supply arrangement as utilized in conjunction with chains (52 through 56).

The first decorticating drum (D1) is revealed in some detail in FIG. 3, with this being a rotating device driven by a hydraulic motor (90). The exterior surface of the drum (D1) is equipped with a plurality of evenly-placed cutter bars, with cutter bar (92) being typical. The cutter bars are disposed at a common radius, so that each cutter bar can operatively interact with shear bar (94), or more particularly, with the sharpened edge (96) of the shear bar.

The first or butt end decorticating drum (D1) differs from decorticating drums (D2) and (D3) described hereinafter, for the first decorticating drum performs primary as well as secondary cleaning action on the butt ends of the ramie plants. The primary cleaning of the stems as they are fed perpendicularly into the drum is to break up the stems' woody pith as it entered into the rotating drum and is knocked downward while interacting with the shear bar. The secondary cleaning of the stems is the action of the drum stripping or decorticating all foreign matter from the fiber as the stem is pulled out of the drum, thus leaving "clean decorticated fiber", which, in actuality, is obtained from the skin of the stems.

Considering the decorticating drums now in more detail, the drum (D1) as well as the drums (D2 and D3) each involve the use of long, helically configured bars arranged in a symmetrical manner and at a common radius on the outer surface of the drum. With reference to FIG. 14, it will be seen that a helical bar (92) is caused to move past the machined edge (96) of stationary shear bar (94) as the drum rotates, with the clearance between the bars and the cutting edge of the shear bar being on the order of 0.030" to 0.050". The drum (D1) differs from the other two drums, however, by being shorter as well as having a smaller diameter. It is to be understood that each of the decorticating drums has a constant diameter along its length.

With continued reference to FIG. 7, it will be seen that this figure bears some resemblance to FIG. 3, but it provides additional detail insofar as the relationship of the ramie plants to the decorticating drums is concerned. The butt ends of the plants seen at the left side of this figure to be entering drum (D1) are typically inserted for a distance of 12" to 16", with the rotating bars (92) on the drum interacting with the cutting edge (96) of the shear bar (94) in such a way as to effectively remove undesired portions of the stalk of the ramie plants.

Approximately at the time the stalks have extended sufficiently far into drum (D1), and have reached the approximate mid point of drum (D1), they are engaged by a rearwardly moving transport at 90° to five chains on apron belt 100 that is disposed along the right hand longitudinal edge of the vehicle, which is the upper edge as viewed in FIG. 3. What we regard as the transport belt (100) is actually a pair of endless belts driven at the same speed, with upper grip belt located above the lower grip belt. The upper and lower belts (100) interact so as to grasp therebetween, the freshly cleaned fibers of ramie, and to cause the fibers to move in a generally rearward direction.

The same type of roller belt (76) shown in FIG. 10 can be used in conjunction with the belts 100 to help increase the gripping power of the upper and lower portions of the transport belt 100, such that the ramie fibers are gripped very tightly.

We have found it advisable to utilize a first upper and lower pair of belts in the area of the first and second decorticating drums, and a second upper and lower pair of belts in the area rearward of the second decorticating drum. A bit of overlap exists between the first and second pairs of belts, so that the function of the transport belt (100) will be continuous, and the path of travel of the ramie fibers remain uninterrupted. As thus explained, the belts collectively known as the transport belt (100) function to tightly grip the ramie fibers, and assure their rearward movement at the desired speed.

Because the stalks continue to reside in a direction parallel to the 45° angularity established on the apron (40), the rearward movement of the stalks causes the upper ends of the stalks to enter drum (D2), in the general manner depicted in FIG. 13. The drum (D2) utilizes the same type of helically disposed bars designed to operate in conjunction with the machined edge of a shear bar, as were described in conjunction with drum (D1). As before, the entry of the upper ends of the ramie plants into the decorticating drum causes the removal of unwanted outer and inner portions of the stalk from the upper ends of the ramie plants.

It is to be noted that in the present instance, we prefer to utilize a generally U-shaped shear bar (130) in conjunction with decorticating drums (D2 and D3), and this shear bar is also called a breast plate. From FIG. 13, it is readily apparent that the axes of rotation of decorticating drums (D2 and D3) are each disposed at a 45° angle with respect to the direction of travel of the vehicle (10), with approximately a 90° angle existing between the axes of rotation of these drums.

It is to be understood that during the functioning of the drum (D2), the cooperating portions of the transport belt (100) continue to move the cleaned butt end fibers rearwardly, which causes these cleaned fibers to move along the relatively smooth interior surface of the breast plate (130). It is also to be understood that the cleaned butt end fibers are in effect supported by the breast plate (130), with the fibers of the middle portion of the ramie plants subsequently being cleaned by the action of the drum (D3). Therefore, as the components of the transport belt (100) continue moving the cleaned butt end fibers rearwardly, they cause the withdrawal of the fibers from drum (D3), with all of the unwanted ramie plant portions having been removed by this time, by the combined actions of the decorticating drums.

Figure 11:
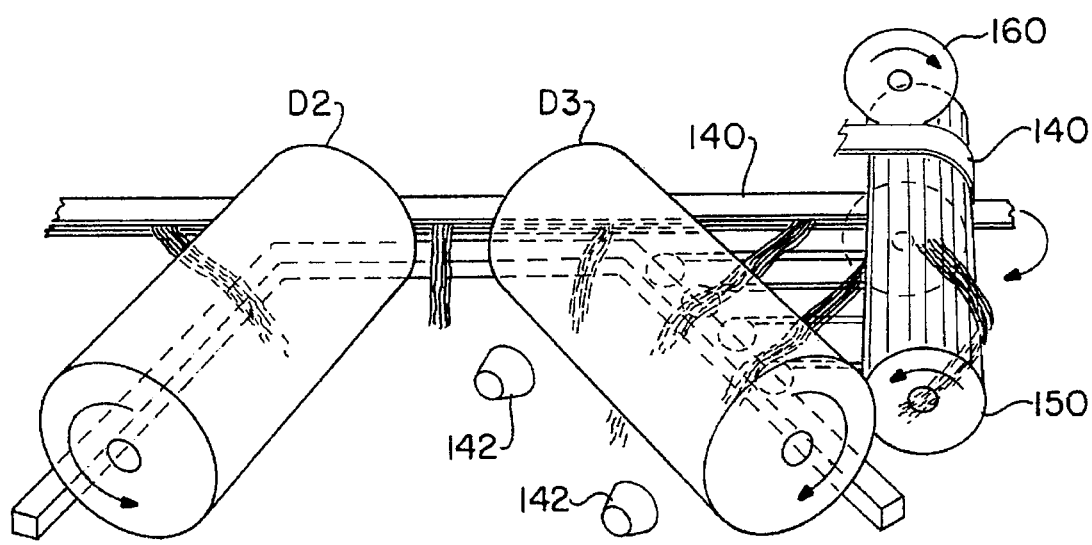
FIG. 11 is a perspective view showing the transport movement of the stalks as they enter into Drum 2 for primary cleaning or decortication of the portion of the stem that has not yet been decorticated by the butt drum. The stems continue to enter in the Drum 3 where the fiber is pulled out perpendicular and is totally cleaned of all debris as it is pulled from Drum 3. The decorticated four-to-six foot hanks of fiber are then belted onto a rubber drum where the ramie is then cut into predetermined staple lengths (approximately 3 inches) by a series of rotating blades.
Figure 12:
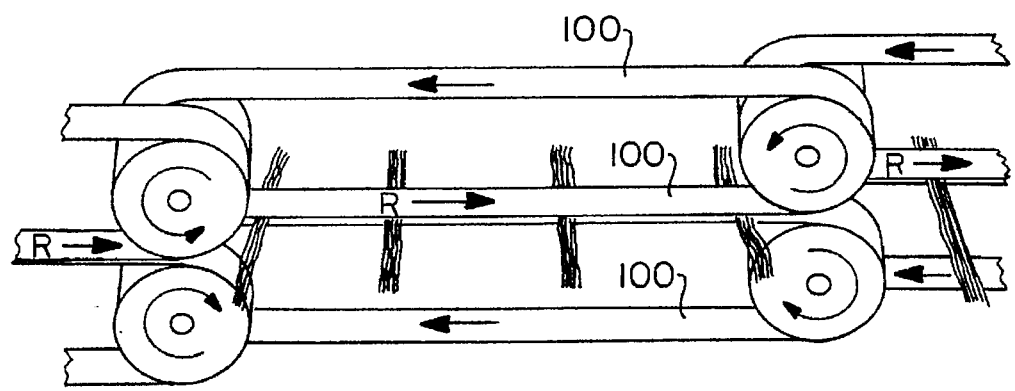
FIG. 12 is a cross cut view of the main set of belts which transport the fiber through the series of Drum 2 and Drum 3.
Figure 16:
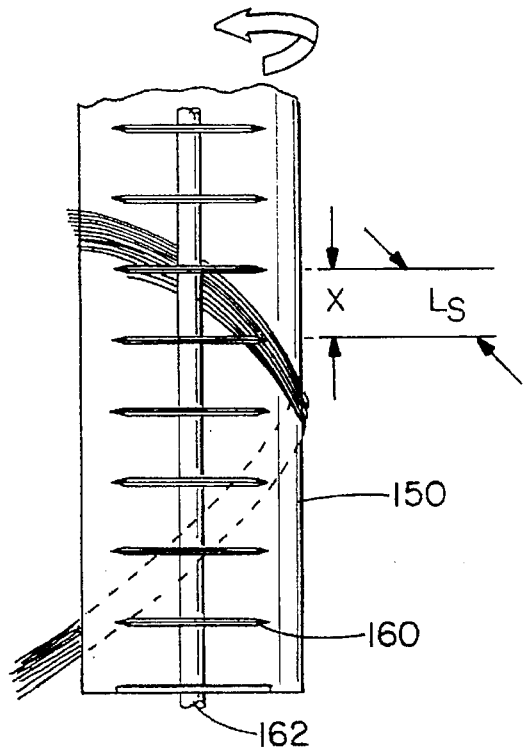
FIG. 16 is an overview of the cutting blades which rotate at high speeds to cut the ramie hank into predetermined lengths. The cutting blade drum sits on top of the rubber grip drum.
Figure 17:
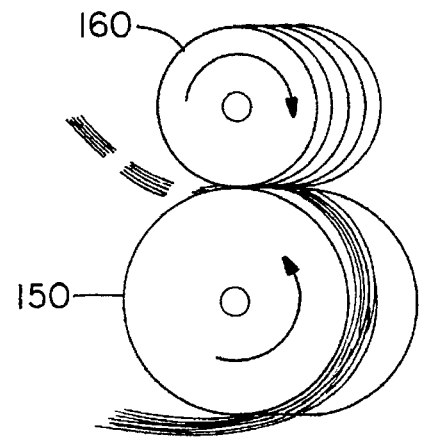
FIG. 17 is an end view relating the cutting blade drum and the rubber grip drum.
Figure 18:
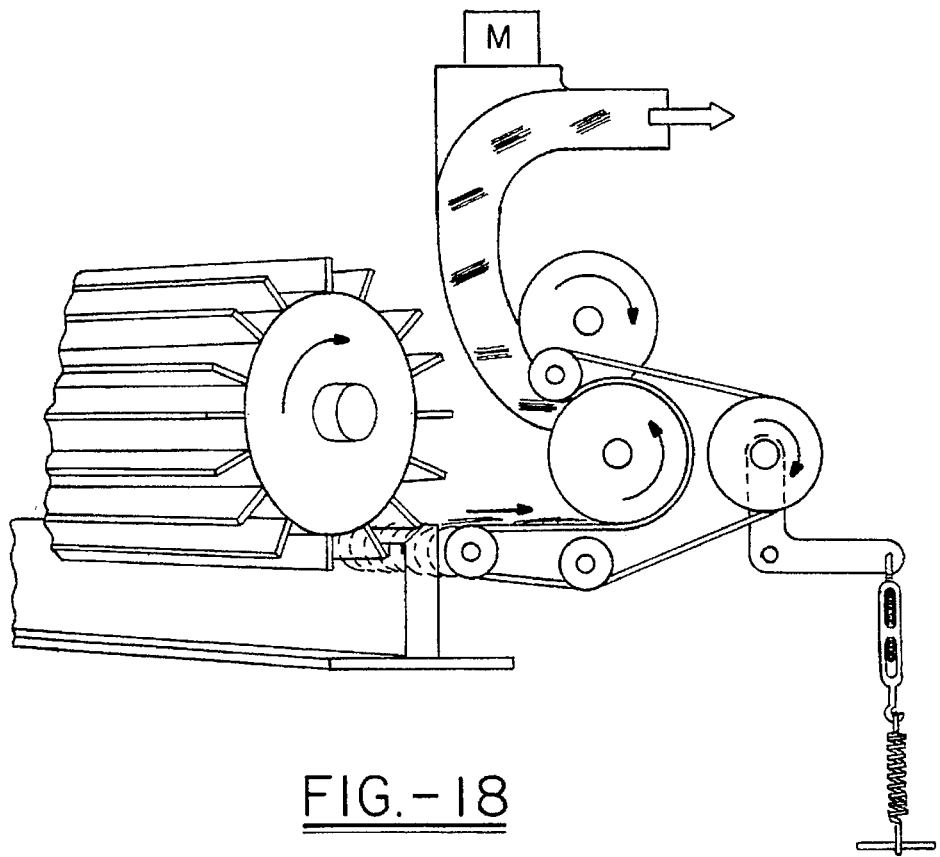
FIG. 18 is an end view of the fiber stapling system showing the relationship between the cutting blade drum, the rubber grip drum, the belt pulley tension drum and the No. 3 decorticating cleaning drum.

With regard to FIG. 11 as well as FIG. 13, it is to be understood that the fibers leaving the decorticating drum (D3) are residing at a 45° angle to the direction of travel of the vehicle over the ground. To form the support for the fibers, so that they may be cut to a desired length, we provide a belt array (140), constituted by more than a dozen individual, rearwardly moving belts, residing in a parallel relationship as seen in FIG. 3 and FIG. 13. The forwardmost portions of these belts pass around respective pulleys located closely adjacent drum (D3), with these belts then winding around an elongate, cylindrically-shaped roll (150) as seen in FIGS. 11, 13 and 16, whose axis of rotation is perpendicular to the direction of travel of the vehicle over the ground, and thereafter pass around a series of pulleys (152). The fibers carried upon the belt array (140) come into initial contact with the underside of the roll (150), and then wrap around the roll and emerge at the top thereof. This is made clear in FIGS. 11 and 16, which depict the ramie fibers being held against the outer surface of the roll (150) by the numerous belts of belt array (140). It is most important to note that the groups of ramie fibers are spread substantially evenly over the surface of the roll (150), and are disposed at a 45° angle to the axis of rotation of the roll (150).

The highly advantageous way that the ramie fibers are held in close contact with the surface of the roll (150) lends itself to the use of a series of circularly-shaped cutting blades (160) disposed in a carefully spaced array upon the rotating shaft (162), which blades are utilized for severing the fibers into pre-established lengths. It will be noted that the series of cutting blades are disposed intermediate the numerous belts of the belt array (140), so no belt damage is sustained.

The exterior surface of the roll (150) may for example be of rubber or the like, and the peripheral edges of the rotary cutting blades (160) are caused to be disposed in touching contact with the surface of the roll (150). As a result of this touching contact, the blades may cut shallow depth grooves in the surface of the roll (150). Because of this arrangement, the ramie fibers cannot pass uncut by the rotary cutters. Typical speed is about 2000 RPM.

The cutting blades (160) are not rigidly affixed to the shaft (162), but rather can be selectively moved to some degree along the shaft, until a spacing of blades has been achieved which is consistent with the length of fibers desired. The lock nuts at both ends of the shaft are tightened down to hold the blades into position. Preferably, the ramie is stapled or cut to about three inch lengths.

Figure 8:
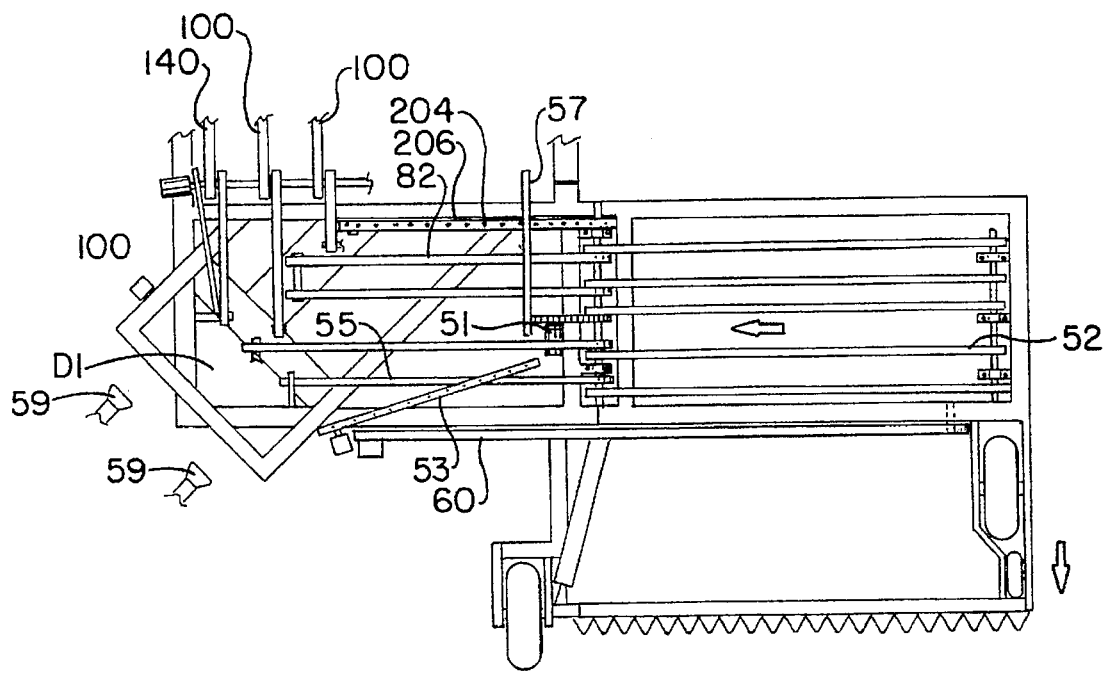
FIG. 8 is a view from above, showing the belt conveyor system as is mounted on the front apron driven by hydraulic motors.
Figure 9:
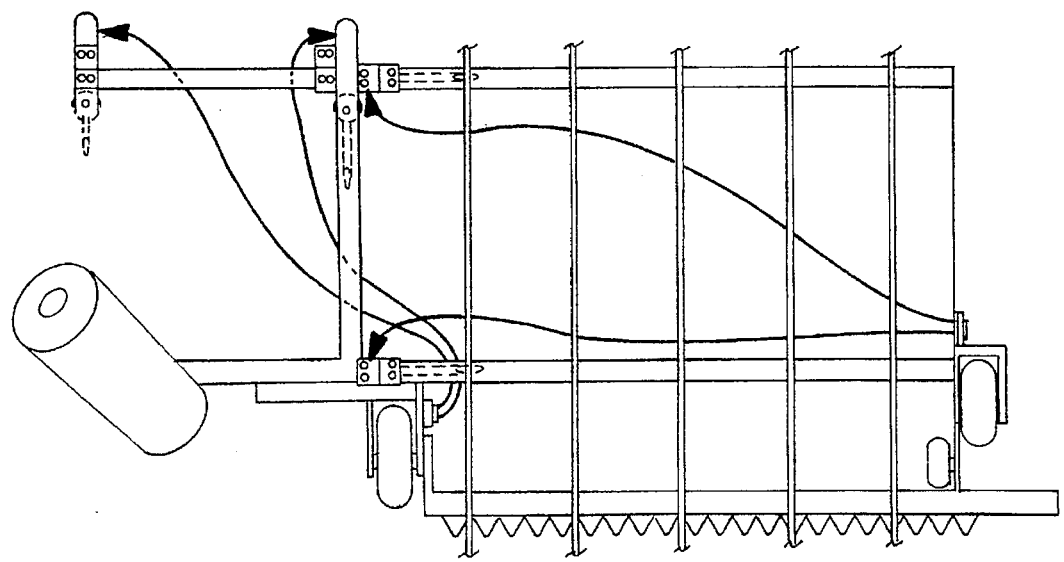
FIG. 9 is a view from above of the details associated with the mounting of the apron components. Three wheels are used, two as main transport plus a sensing wheel device (smaller wheel)

It should be understood that all of the ramie stock being cut by the harvester of this invention is actually utilized in one way or another. Specifically, looking at FIG. 5, as the top of the ramie stock is held in the top belts long after the bottom end is cut and then moved into the 45° angular relationship to enter the first decorticating drum (D1), ultimately the tops are cut by the cutter wheel (200) with the tops (202) then falling off into some type of collector, or onto the ground for collection. In addition, any remaining shoots on the stalk below the top point where it is cut will be stripped by pins (204) arising off belt (206) as best seen in FIG. 8 of the drawings. In effect, the top end of each cut stalk is wiped through the pins (204) and all remaining stems extending off the main stalk is thereby stripped, and again are collected either by falling into a bin where they strip off or by falling on the ground and are later picked up off the ground. Typically, the leaves from the plant will be ground up and used up as cattle feed, as it has very high protein and roughage content.

It is an extremely important aspect of the invention that the basic stalk be slanted at the 45° angle on the entry so that when it enters the decorticating drum (D1), it actually enters at an exact perpendicular relation to the rotational axis of drum (D1). In order to assist with this proper positioning, not only is the belt (60) and associated pins moving faster than the other belts (52), but a series of angular guides (210), as best depicted in FIG. 1, are also utilized to guide the lower end of each stalk as it continues to move down in the top endless belts to further assist the 45° angle positioning of the stalks onto the belts so as to achieve the 90° angular relationship to decorticating drum (D1). Only one guide bar (210) is illustrated in FIG. 1, as only one entering pair of belts is shown, but it is to be understood that there are multiple guide bars, each one associated with each one of the associated pairs of belts.

PROCESSING DESCRIPTION

Thus, to fully understand the processing of the ramie or other bast fiber through the harvester, a general description of the processing is set forth. Particularly, looking at FIG. 1, it is to be understood that this is a four head cutting pickup unit with the conveying grip belts and associated curved "kick" bars which are imperative to align the stems at a 45° to be fed correctly into the first decorticating drop (D1). It should be noted that the cutting head (30) moves up and down to adjust to the height of the crop, and similarly the gripper belts are adapted to move up and down as is the receiving table (42).

Figure 5:
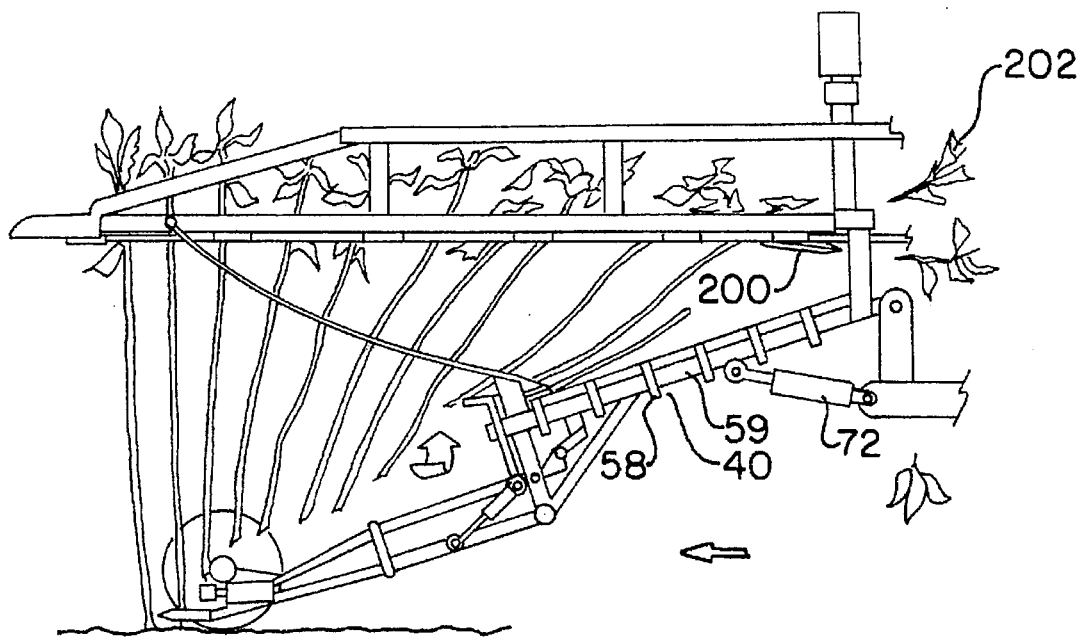

The cutting blade (200) cuts the upper 18" approximately from the plant while the whole stem is gripped, and with the top leafy portion of the stem conveyed off the machine with the stem dropping onto the conveying table to be conveyed by the moving chains into the butt decorticating drum (D1). The cutting blade (200) as best seen in FIGS. 4 and 5 moves upward and downwardly to adjust to the height of the plants, be it 7 foot plants or 4 foot plants.

It should be understood that there are four sets of chain movements on the receiving tray (42), and these are best seen in FIGS. 6, 7, and 8. The first chain (60) is the kicker chain which has to travel faster than the stem conveying chains (52) behind the kicker chain (60) to align the stems at 45° to go into the butt decorticating drum (D1). The chain (53) is the detangler chain which combs the stems into place in case they have overlapped. It has similar pins to the pins on chains (60). The third set of chains are the overhead grippers, and these are identified by numeral (55) which are operative to hold the stems in place as they go into the decorticating drum (D1). An over and under set of chains (57) operating substantially normal to the chains (52 and 55) also have opposing pins on them which are not visible in the top view of FIG. 8, but these act as the leaf stripper to pluck off any leaves left on the stem, and it can be seen that they are located at the upper or further rearward section of the receiving table (42). The decorticating drum (D1), as seen in FIG. 8, is the butt decorticator which decorticates the bottom 18" approximately of the plant, which is the toughest or woodiest part of the stem. It may also be desirable to incorporate water spray nozzles (59) onto decorticating drum (D1) which helps the decortication process. The nozzles (59) are schematically indicated on FIG. 8, but a suitable water supply and pumping system would be provided.

Then after the stalk leaves drum 1, it is best seen how it progresses towards drums 2 and 3 by viewing FIG. 11. Essentially, the double chain gripping arrangements (100) as seen in FIG. 8 move the stalk in the same grip relationship as shown in FIG. 10, for example and the chains (100) move the butt end of the stalk out of the decorticator (D1) and into the end gripping belts (140) which then allows the decorticating drum (D2) to rip off initial cortex and phloem contained in the stem in the middle. The stalk then passes on to the decorticating drum (D3) which is the final cleaning drum, and this cleans any loose material that may still be hanging on from the crushing drums (D1 and D2). It is also contemplated that drum (D3) will have water spray nozzles to help facilitate the decortication or cleaning process leaving only fiber. The water spray nozzles (142) are indicated in FIG. 11 schematically as they might be associated with drum 3. Essentially, the gripping of the stalk between the opposed belts (140) holds the stems allowing for no slippage while maintaining a 45° angle while going through both drums 2 and 3, as is best depicted in FIG. 11.

It should be pointed out in connection with drum 3 that the moisture content of the fiber is such that it doesn't cause sticking which converts to fiber loss.

FIG. 13 illustrates a plurality of stainless steel bars (221) which are mounted immediately adjacent to the breast plate to hold down the fibers and also to impede cavitation as the fibers being pulled out of the number 3 drum. These are simply little fingers that extend out and are angled to hold the ramie fibers under as is illustrated in FIG. 13. Similarly, there could be further stabilelization bars over the belt system (140) between the outside of drum 3 and the stapling drum and blades which are likewise indicated by number 223. These simply tend to hold the ramie fibers against the belt so that they tend not to flop and essentially reduce cavitation. The belts (140) then transport the fully cleaned fiber to a 45° wrap around the stapling drum where the cutter blades (160) achieve the appropriate cut to the stapling lengths and a vacuum system (164) sucks the stapled cut lengths and deposits it in a container (166), for example. FIG. 13 illustrates simply one pick off point on the course or butt end of the ramie, but the invention contemplates that at least three pick up points will be provided to cover the butt end, the middle, and the top end as selectively desired so as to get a separation from the course end, to the middle, to the upper end where the finer ramie fibers are located. It also is advantageous to include an air jet schematically depicted as 168 that will blow the ramie, once it is cut, into the vacuum suction opening of tube (164). A plurality of these air jets (168) will be provided along the length of the stapling drum designed to blow the fibers as they are cut by the blades into their short 2-3 inch lengths into their respective vacuum suction systems. Effectively the tube (168) provides for a high pressure air lift which lifts the fibers off of the rubber stapling drum after the fiber has been cut allowing the suction drum blower to work with better efficiency. Essentially, the pipe (168) will have holes and nozzles that can direct the air flow at the inside of each cutting blade on each side thereof and one at the middle of two cutting blades.

Hence, effectively there will be three holes or nozzles directed in association with each cutting blade.

It is to be understood that the stapling system showing the bladed discs effectively cut the fiber to any predetermined length, and then having been cut, the fiber is sucked up from the rubber drum via the three suction drum blowers which divides and classifies the fiber as per denier which can also provide a systemization of quality control. The fiber can be blown into a bulk truck which has three different holding tanks. It should be noted that several classifications can be obtained by modifying the suction drum blowers, or even utilizing only a single blower. The fiber could also be blown into different colored boxes on the back of the harvesting machine.

It should be understood that the fiber crops which can be harvested utilizing this system are ramie, kenaf, sunn, hemp, jute, roselle, and any similar to the bast family or fibers in the skin (bast) of the stem.

PROCESS

Chemical processing of ramie must occur fairly quickly after decortication. This is due to the rapid bacterial oxidation of the fiber which occurs subsequent to cutting, if the fiber is not dried. Because of the high gum (xylan and araban) content of up to 35%, retting is not possible with ramie. The fibers are more typically separated chemically by boiling in an alkaline solution in open vats or under pressure, washed, bleached with hypochlorite for example, neutralized, oiled to facilitate spinning and dried. The degummed, bleached fiber contains 96–98% cellulose.

One of the advantages of the fresh degumming of ramie staples taught in this invention, is that it affords chemical recovery from waste liquor as field spray, thereby saving ramie fertilizer cost. One exemplary, but non-limiting example of the subsequent chemical ramie processing would include spraying fresh ramie staples with waste degumming liquor, preferably heated to ~60° C. The washed fiber staples (liquor ratio ~6:1) are treated with a solution of ~2% soap (hexasodium metaphosphate) and 0.2% emulsifier, e.g., palm oil, under slight pressure (~15 psig) for 1–1.5 hours, followed by pressing out waste liquor to a storage tank. The ramie fibers are then treated with a solution (liquor ratio ~6:1) containing ~2% base (e.g., ammonia), ~2% antioxidant (e.g., sodium sulfite) and ~1% hexasodium metaphosphate at essentially boiling temperature for ~1 hour, followed by pressing out the waste liquor to a storage tank, and washing of the degummed fiber.

Bleaching of the degummed fiber may include chlorine bleaching with for example, a 0.1–0.5% NaOCl solution at 30°–40° C. for ½ hour followed by subsequent pressing out of waste liquor and washing. It is envisioned as a component of this invention would include alterative bleaching steps, such as are known in the art, e.g., totally chlorine free bleaching using ozone and peroxides or a combination thereof.

The bleached degummed fiber is then subjected to an alkali extraction procedure (liquor ratio ~6:1) using 0.5% anhydrous sodium sulfide (anti-oxidant) for 0.5 hours at ~10 psig with subsequent pressing out of waste liquor to a storage tank. Acid washing with a mild acid, e.g., 0.5% acetic acid) typically follows with pressing out of the waste liquor. The wet fiber is softened in an emulsion containing a mild soap solution in 50% kerosene oil for two hours with stirring and emulsion circulation followed by centrifugation to remove the excess emulsion for reuse. The product is dried in a hot air drier, typically a rotary drier. The fiber yield is 74–80% in comparison to the 65% currently obtained.

The ramie processing described can be varied in many different ways and some of the above processing steps may be repeated as necessary without departing from the spirit and scope of this invention. One of the key advantages to the immediate processing of the decorticated ramie without drying, is that less chemicals are used in the processing, less heat is required and the environment to which the ramie is exposed is less harsh than conventional processing, resulting in a superior ramie product, which is more elastic.

Thus the overall process of the ramie in the machine is as follows:

1) The stalk is gripped approximately 18" from its top, and effectively the plant is held in a vertical position instantaneously while it is cut approximately 6" from the ground.

2) Still gripping the top part of the stalk, the stalk is laid on the receiving platform and moved to a 45° angled relationship to the receiving platform so as to be in a direct 90° relationship to the butt decorticating drum. Near the end of the angular placement on the receiving table, the top 18" of the stalk is cut and that portion of the stalk and the leaves is recovered to make cattle feed or for other suitable use.

3) Any remaining leaves on the stalk are stripped off by the stripping mechanism at or prior to decortication of approximately the 18" of the butt end, and that excess stem and leaves is also gathered for use as cattle feed or other suitable usage.

4) The butt decortication takes place by holding the top end of the stalk and allowing the bottom 18" approximately to feed into the decortication drum where a helically shaped dull blade scrapes the stem against the breastplate or a cutting edge with approximately a 0.030 to 0.050 inch clearance between the blade and the breastplate through which the stock is pulled by the rotating about 2500–3500 RPM and moving action of the cutter blade against the cutting edge. Typically there will be twelve blades on a decorticating drum which will have a diameter of 12–16" with each blade itself having a height from the drum of about 2". The bulk of the stem that is stripped from the butt end of the stalk during this decortication process simply passes to the ground and is effectively fertilizer for the next crop to be grown.

5) As the butt end of the stock is decorticated to the approximate 18" length, it is then gradually pulled out from between the blades and the breastplate, it is clamped on the end which has been decorticated and cleaned, and then the non-decorticated end is fed into a second drum also at a 90° relationship to the rotational direction of the drum with the entire non-decorticated length of the stalk then being decorticated by this drum, and again all the materials stripped is passed to the ground under the machine.

6) The fully decorticated fiber is then passed through a third cleaning drum where all remaining debris is fully stripped from the fiber. The fiber effectively enters this drum at approximately a 45° angle to the direction of rotation, but as it moves on through the drum, it ends up being pulled out the opposite side at a 90° relationship to the drum, and essentially the full length of the stalk and fiber associated therewith is pulled through and cleaned by drum 3.

7) The fully cleaned fiber then wraps in a 45° convolution around the stapling drum and blades, and the blades cut the wrapped fiber to approximately 3" lengths, such lengths then being blown off the cutting drum and blades, into a vacuum system, and into a selective retaining drum that is associated with the respective vacuum system. By selectively locating the vacuum systems along the length of the stapling drum, one can divide the collected fibers into those associated with the butt end, the middle, and the top end of the stalk. It is well known that the fibers from the top end of the stalk are finer and therefore more valuable than those from the butt end.

8) Water is added to the decortication process by spraying it on at drum 1 and at drum 3, and when the fiber passes into the final storage tank, again appropriate chemical cleaning and finishing will begin immediately because of the appropriate chemicals being included in the storage tank.

In accordance with the patent statutes, only the best known embodiment of the invention has been illustrated and described in detail, but it is to be understood that the invention is not limited thereto or thereby, but that the inventive scope is defined in the appended claims.

What is claimed is:

1. A bast fiber harvesting mechanism comprising:

a frame;

a means to hold the fiber stock near its top and simultaneously cut it off near its base attached to a front of the frame;

a means to position the cut fiber on to a receiving table on the frame and position the stalk at approximately a 45° relationship to said receiving table while still holding the top, said positioning means in operative connectivity with said means to hold the fiber stock;

a means on the frame to cut the top of the stalk off after the stalk is properly positioned on the receiving table;

a means in operative connectivity to the receiving table to feed approximately the lower one third portion of the stalk into a first decorticating drum on the housing at approximately a 90° relationship to said decorticating drum while holding the end of the stalk;

a means to remove the butt end of the stalk from the first decorticating drum;

a means to grip the stalk by the butt end, said means to grip the stalk in operative connectivity with the first decorticating drum;

a means to align the stalk normal to a second decorticating drum on the housing;

a means in operative connectivity with the second decorticating drum to feed the remainder of the stalk through the second decorticating drum in an approximately 90° feed relationship to the rotational axis of the decorticating drum;

a means to pass the entire stalk in an approximate 90° relationship through a third cleaning drum on the housing, said means to pass the entire stalk in operative connectivity with the third cleaning drum;

a means to wrap the stalk in a helical fashion around a fourth stapling drum on the housing, said means to wrap the stalk in operative connectivity with the fourth stapling drum;

a means to cut the helically wrapped stock wrapped around said stapling drum into short lengths, said means to cut the helically wrapped stock in operative connectivity with the stapling drum; and a means to gather the short lengths of fiber stalk cut on the stapling drum, said means to gather in operative connectivity with the stapling drum.

2. The apparatus according to claim 1 where means are provided to add water in a spray form to the first decorticating drum as the butts of the stalk are decorticated.

3. The apparatus according to claim 2 which includes means to add water in spray form at said third cleaning drum.

4. The apparatus according to claim 1 wherein means are provided to adjust the height of the upper stalk gripping mechanism to accommodate bast fiber crops of different heights, and including means to adjust the height of the receiving table to receive crops of different heights.

5. The apparatus according to claim 1 wherein a decorticating means for the butt end of the stalk includes a cylindrical drum having a plurality of slightly helically coiled blades extending approximately normal to a surface thereof, each blade having a height of about 2", and the blades cooperating with a breastplate at a spaced relationship of between 0.030 to 0.050 inches, and wherein the first drum rotates at between 2500–3500 rpm during the decorticating operation.

6. The apparatus according to claim 5 wherein these said second and third decorticating drums have a greater axially length than the first decorticating drum, and operate at rotational speeds approximately between 25–35% slower than the first decorticating drum. decorticating cleaning drum to the stapling drum.

7. The apparatus according to claim 6 which includes hold down bars provided with the breastplate associated with the said third decorticating drum to hold down the fibers as they are pulled from the third drum and to prevent cavitation of the fibers as they move from said third decorticating cleaning drum to the fourth stapling drum.

* * * * *